United States Patent [19]

Sylvester

[11] 3,880,291

[45] Apr. 29, 1975

[54] GREEN TIRE CARRIER

[76] Inventor: Rowland L. Sylvester, 718 S. Chapin St., South Bend, Ind. 46621

[22] Filed: Feb. 19, 1971

[21] Appl. No.: 116,929

[52] U.S. Cl. .................. 211/24; 211/183; 182/132
[51] Int. Cl. ............................................. A47f 7/04
[58] Field of Search ............ 211/24, 23, 20; 182/91, 182/132

[56] References Cited
UNITED STATES PATENTS

| | | | |
|---|---|---|---|
| 1,438,729 | 12/1922 | Vance | 211/23 |
| 2,923,374 | 2/1960 | Harwell | 182/132 |
| 3,322,286 | 5/1967 | Sylvester | 211/24 |
| 3,348,698 | 10/1967 | McConnell | 211/24 |
| 3,557,966 | 1/1971 | Skubic | 211/24 |

FOREIGN PATENTS OR APPLICATIONS

| | | | |
|---|---|---|---|
| 155,489 | 12/1920 | United Kingdom | 182/132 |

*Primary Examiner*—Nile C. Byers, Jr.
*Attorney, Agent, or Firm*—Oltsch & Knoblock

[57] ABSTRACT

A green tire carrier having a wheeled frame providing support at three levels thereof for tire carrying sling members, each sling member being adjustable between several operative positions and an inoperative position accommodating access to tires on the sling therebelow. A step is carried by the frame along at least one side thereof adjacent and below the lowermost sling support and at an elevation to facilitate application of tires to and removal of tires from the upper sling by a workman of average height while standing on the step. The step may be shiftable between operative position projecting laterally from the frame and a retracted position.

8 Claims, 14 Drawing Figures

PATENTED APR 29 1975 3,880,291
SHEET 1 OF 3
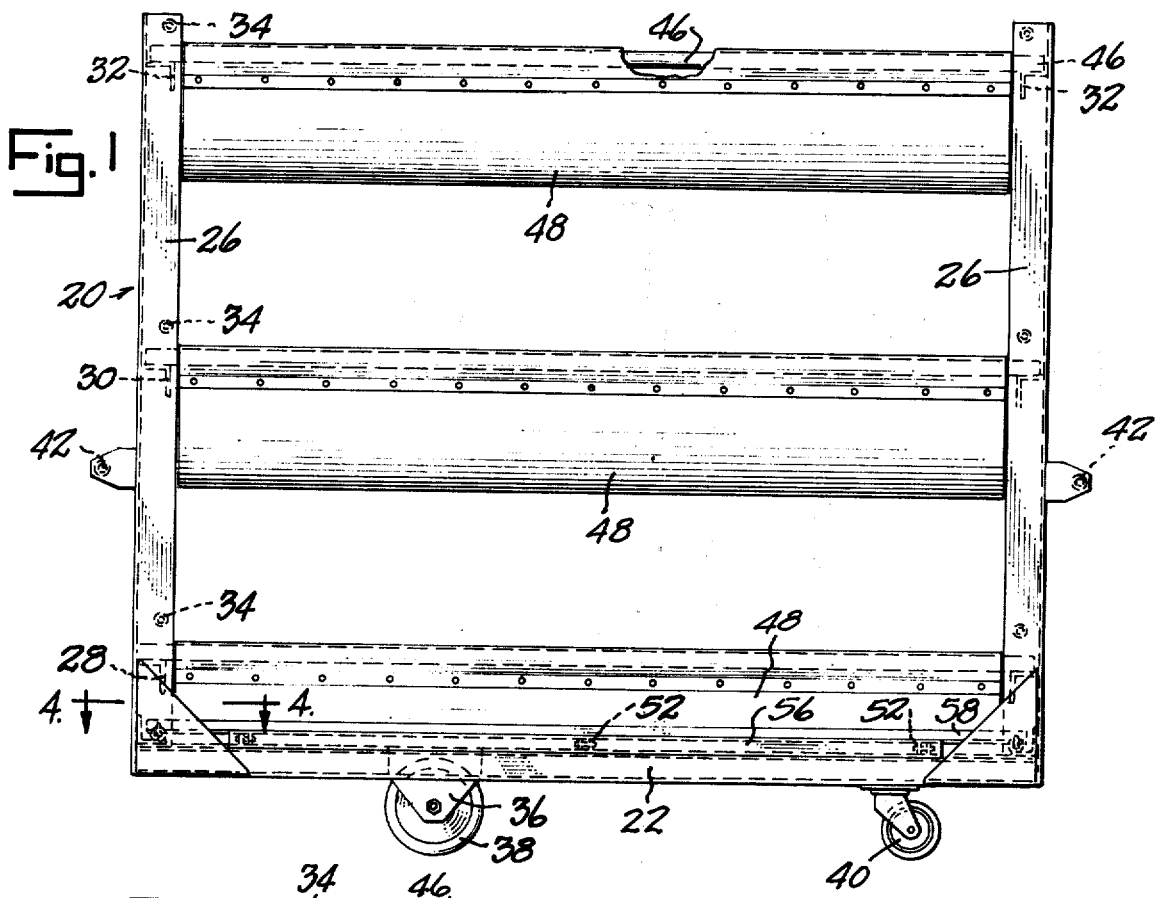
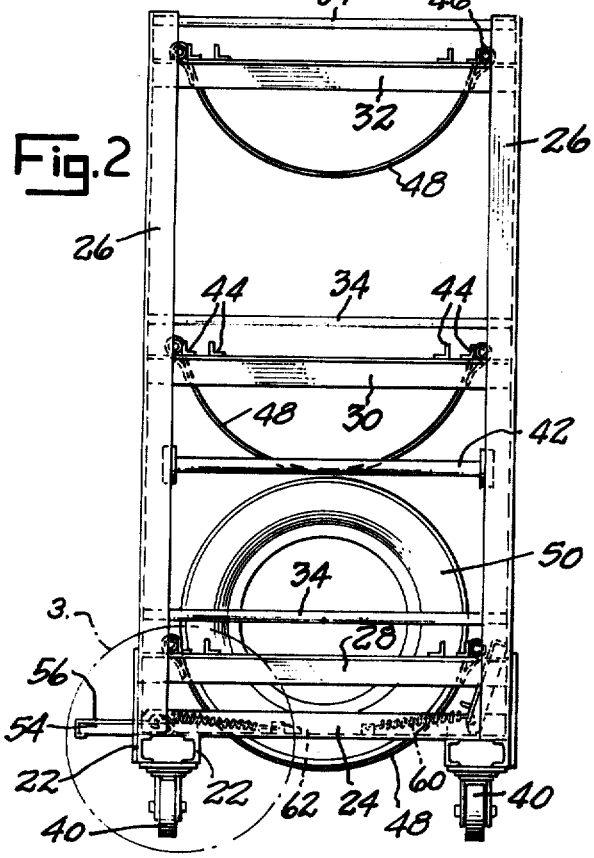
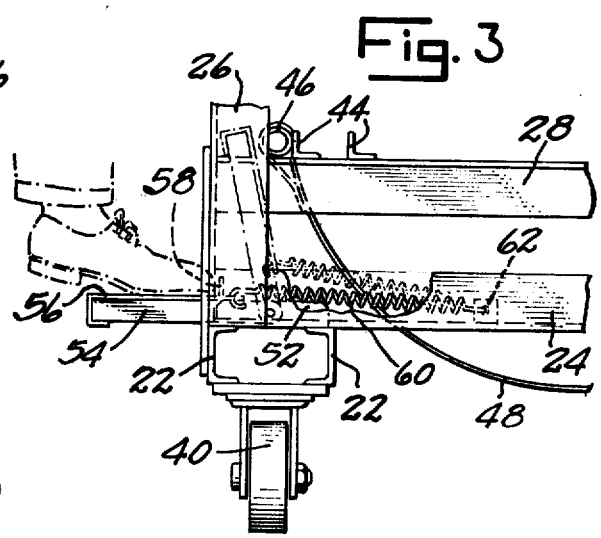
INVENTOR.
ROWLAND L. SYLVESTER
BY
Altide & Knobbe
ATTORNEYS

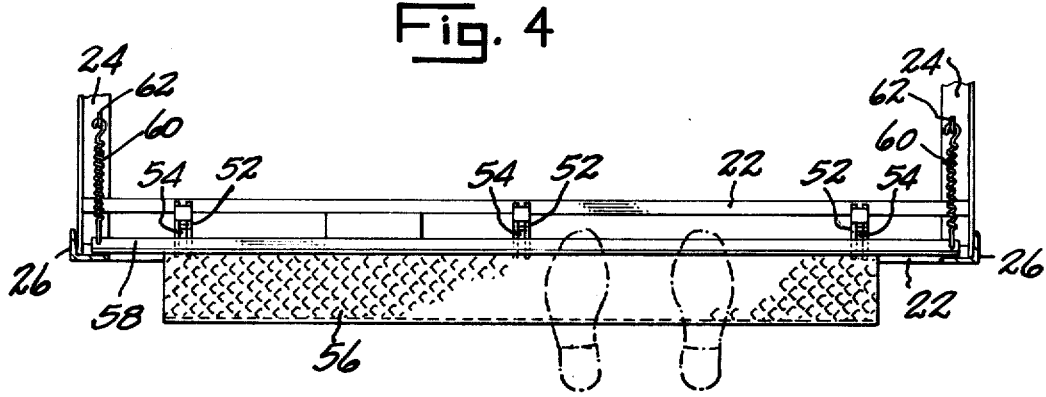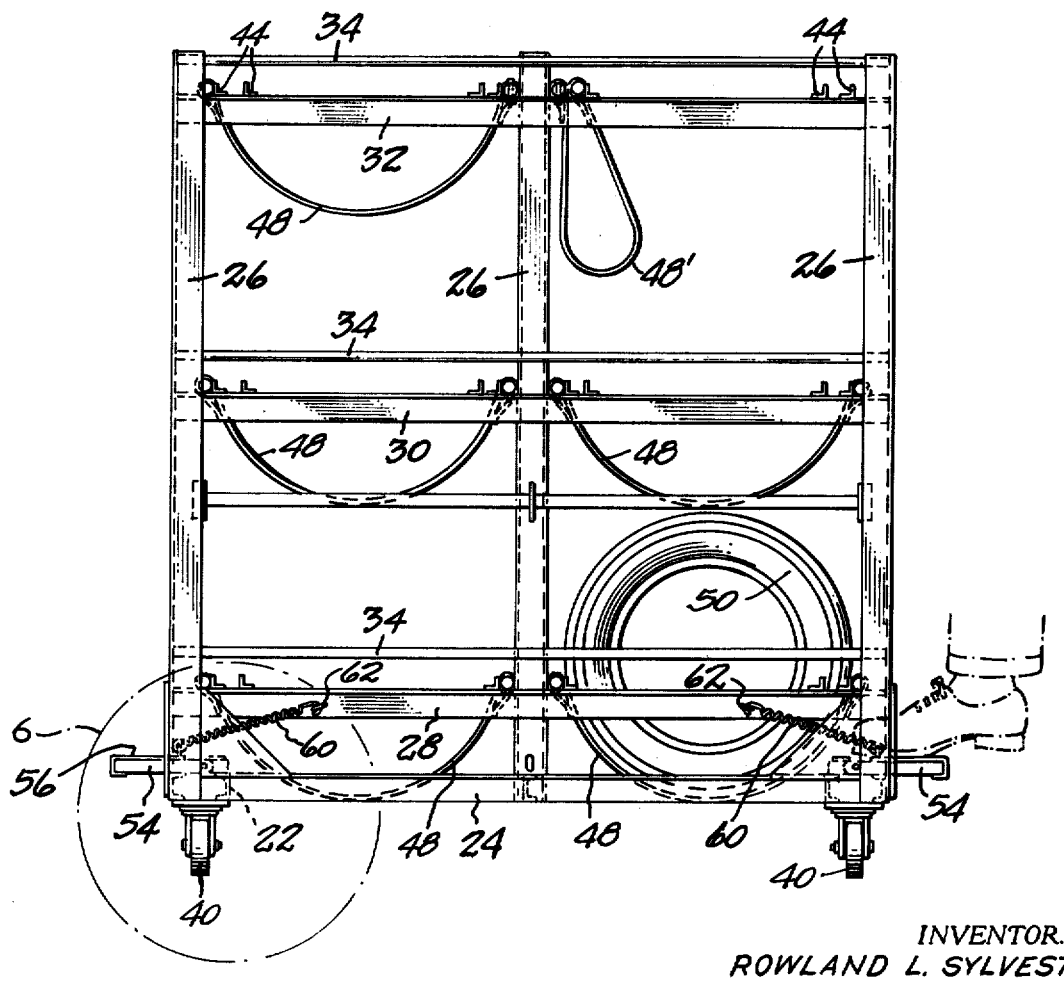

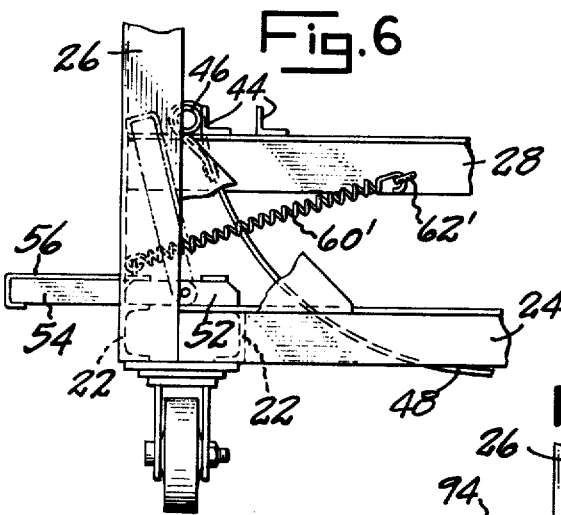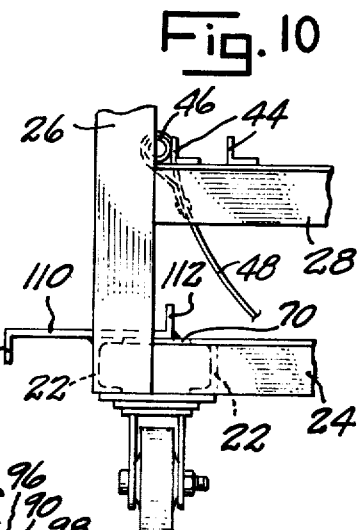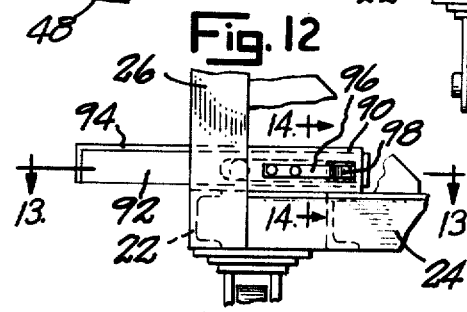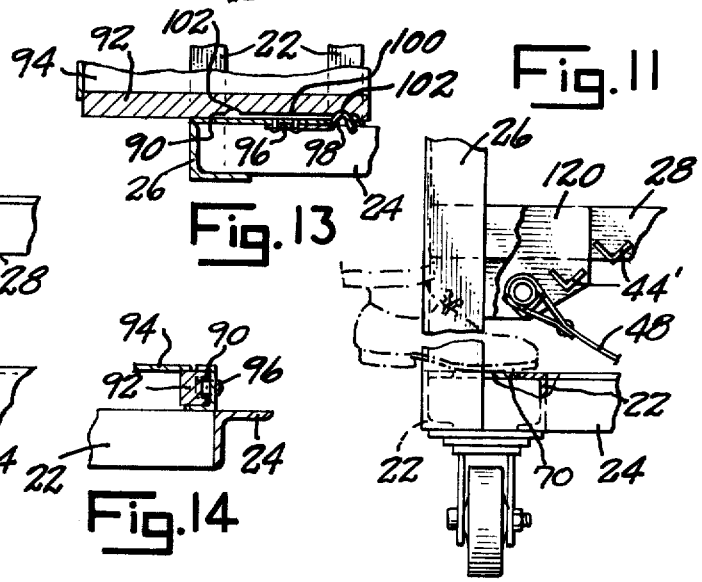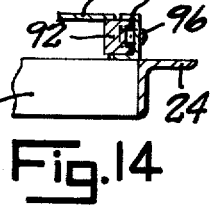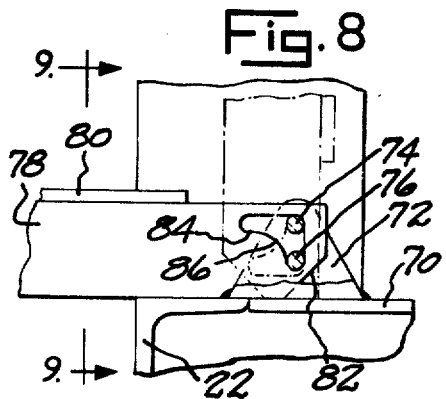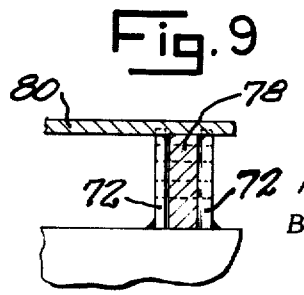

GREEN TIRE CARRIER

This invention relates to green tire carriers, and particularly to carriers for supporting green or uncured rubber tires with embedded reinforcements in the carcass thereof and for transporting them from a point of assembly to a curing station.

Sling-type green tire carriers produced heretofore have been as shown in my U.S. Pat. No. 3,322,286, dated May 30, 1967. Such carriers have served their intended purposes well, but have lacked adequate capacity for most economical use of space and manpower. Thus, prior sling-type carriers have been limited to accommodate only two superimposed tiers or single tiers of sling carriers. The dimensions of automotive vehicle tires are such that a workman of average height cannot load and unload tires at heights required to make practical a three-tier sling-type unit. Therefore, it is a primary object of this invention to provide a sling-type carrier in which tires may be readily applied to and removed from slings at three levels or tiers.

A further object is to provide a device of this character in which flexible tire slings are supported at three different levels and are adjustable to readily receive and accommodate tires of several sizes within a given range in a manner providing slight clearance for tires of the largest size within the range.

A further object is to provide a device of this character having a plurality of sets of tire-supporting slings arranged in vertically spaced relation in which a step member is mounted upon the device at a level lower than the support for the lowermost sling and at a position enabling a workman of average height to stand thereon to easily apply tires to and to remove tires from the uppermost slings.

A further object is to provide a device of this character having a step member which is shiftable between an operative horizontal position projecting from the device and a retracted position within the over-all outline of the device to facilitate movement of the carrier with minimum likelihood of interference from building parts or machines in areas in which aisle width and doorways accommodate vehicles of limited lateral dimension.

Other objects will be apparent from the following specification:

In the drawings:

FIG. 1 is a view of one embodiment of my new sling carrier in side elevation with parts broken away.

FIG. 2 is a view of my new carrier in end elevation.

FIG. 3 is an enlarged detail view of a portion of the device circled in FIG. 2 and identified by the numeral 3.

FIG. 4 is a fragmentary horizontal sectional view taken on line 4—4 of FIG. 1.

FIG. 5 is a view in end elevation of a modified embodiment of the invention.

FIG. 6 is an enlarged detail view of the portion of the device shown in the circle 6 in FIG. 5.

FIG. 7 is a detail elevational view illustrating another modified form of the invention.

FIG. 8 is an enlarged detail view of the part of the device enclosed in the circle 8 in FIG. 7.

FIG. 9 is a vertical sectional view taken on line 9—9 of FIG. 8.

FIG. 10 is a fragmentary end elevational view of another modified embodiment of the invention.

FIG. 11 is a fragmentary vertical elevational view of another modified embodiment of the invention.

FIG. 12 is a fragmentary end elevational view of still another embodiment of the invention.

FIG. 13 is a horizontal sectional view taken on line 13—13 of FIG. 12.

FIG. 14 is a vertical sectional view taken on line 14—14 of FIG. 12.

Referring to the drawings, and particularly to FIGS. 1–4 thereof which illustrate one embodiment of the invention, the numeral 20 designates a rigid frame characterized by rigid longitudinal base members 22, rigid transverse base members 24, and rigid upright members 26 at the corners thereof. The frame parts are rigidly interconnected, as by welding, bolting or the like. The uprights 26 at each end are preferably rigidly connected by three transverse rigid members 28, 30 and 32 located at different elevations, with the member 28 being located at a level slightly above the level of the base member 24; the member 32 being located slightly below the upper ends of the members 26; and the member 30 being located intermediate the members 28 and 32. The uprights 26 at each end are also preferably interconnected by transverse members 34, each positioned a predetermined distance above one of the members 28, 30 and 32. If desired, longitudinal frame members may interconnect the corner members 26 spaced above the base thereof and preferably at a level adjacent the intermediate rigid transverse members 30.

The carrier is mounted upon wheels to render it readily transportable from place to place. Thus, as illustrated in FIG. 1, wheel brackets 36 may be secured to the longitudinal base members 22 adjacent one end of the frame and at opposite sides thereof to journal wheels 38, while one or more caster members 40 may be secured to the frame adjacent the opposite end thereof. Handle members or bars 42 may be secured to frame uprights 26 at the ends of the frame to facilitate manual propulsion and maneuvering of the frame. Also, if desired, hitch members (not shown) may be provided to facilitate towing of the carrier by tow trucks or other vehicles.

Each of the rigid transverse members 28, 30 and 32 has secured thereto at each end portion thereof one or more retainer members 44, here shown as angle irons welded or otherwise fixedly secured to the top surface of the transverse members. The retainer members on the transverse members 28, 30 and 32 at opposite ends of the frame are similarly arranged or spaced relative to the uprights 26 and the ends of said transverse members. Retainers 44 serve as means to position rigid poles, rods or tubes 46 which are of a length to extend between and rest upon the transverse support members at the opposite ends of the frame. Flexible sling members formed of fabric or other flexible sheet material 48 are secured to members 46 at opposite longitudinal margins thereof, said sling members being of a width greater than the width of the frame and of such dimension that they provide peripheral support for green tires through a substantial part of the circumferential extent of the tire 50 in the manner illustrated in FIG. 2. The provision of spaced retainers 44 accommodates adjustment of the position of the sling 48 to accommodate tires of different dimensions. The parts are so proportioned as to accommodate tires on the slings supported by the respective transverse members 28, 30, 32 with slight clearance, as illustrated in FIG. 2.

As best seen in FIGS. 2 and 3, the longitudinal base members 22 of the frame are preferably arranged in pairs at the opposite sides of the frame, and at spaced points along the length thereof transverse members 52 are fixedly secured to the upper surfaces of the frame members 22. Each member or pair of members 52 serves to pivot one end of an arm 54. The arms 54 have secured thereto a step-forming plate 56. A longitudinal bar 58 which preferably is of a length less than the spacing of the inner edges of members 24 at the opposite ends of the frame is secured to the arms 54. One or more elongated coil springs 60 are each anchored at one end thereof to an end of the longitudinal bar 58, and at the opposite end thereof to an anchor member 62 carried by a member 24.

The parts are so proportioned and arranged that the step-supporting arms 54 are pivoted spaced from and bear upon the outermost longitudinal base member 22 when in operative horizontal position, as illustrated in full lines in FIGS. 2 and 3. In such position the coil springs 60 are tensioned. The parts are preferably so positioned that the step 56 will retain its extended horizontal position despite the tensioning of the spring 60 as a result of a substantially dead-center position of the spring relative to the pivot member and the spring anchors. The step 56 is readily swung upwardly from this dead-center position to a substantially vertical position within the outline of the frame 20, as illustrated in dotted lines in FIG. 3, and is releasably held in that position by the coil spring 60.

By means of the step construction a workman of average height standing alongside the carrier, who could not reach tires mounted upon the uppermost sling to remove them and who could not place tires within the uppermost sling without standing upon an elevated support, is provided with such elevated support when needed. Thus, the step member 54 substantially increases the reach of the workman and provides a strong, compact, conveniently located part which will support the weight of a workman and permit him to move along the device to any position required for applying tires to the uppermost sling along the full length thereof and to remove tires from the uppermost sling. The step 56 is readily retracted, as by simply applying the toe of the workman under the outer end of the step to initially pivot the same upwardly past the locked or dead-center position, whereupon the springs 60 become effective to move the step to its retracted position. This retracted position minimizes the over-all width of the tire carrier and facilitates its movement from place to place with minimum risk of interference from narrow doorways or from machinery along travel aisles.

The capacity of the carrier may further be increased by the provision of a frame of a width sufficient to accommodate two slings at each tire-supporting elevation thereof, as illustrated in FIG. 5, wherein parts similar to those illustrated in FIGS. 1–4 bear the same reference numerals. In this construction it will be seen that a pivoted step 56 may be mounted at each side of the frame. Another characteristic of the device illustrated in FIG. 5 is shown with reference to the sling 48' at the upper right-hand portion of that figure which illustrates the manner in which an upper sling may be located out of the way while tires are being loaded upon or unloaded from the next lower sling. This is accomplished by positioning both rods 46 supporting the sling alongside each other, as at retainers 44 remote from the side of the unit at which the workman stands. This feature of the unit renders feasible the close vertical clearances of tires in different tiers.

FIG. 6 is an enlarged detail view illustrating a pivoted step and a slightly different position of the associated coil spring. In this instance, a spring anchor member 62' is carried by transverse member 28 spaced above the level of the pivot of step 54, 56 so that the coil spring 60' is inclined inwardly and upwardly when in its extended position with the step in operative horizontal position. In this position, the spring 60' serves automatically to maintain the step 54, 56 in substantially vertical retracted position whenever it is not in use. The step 56 can be positioned for use by pressing downwardly thereon, as by the foot of a workman.

Another mounting accommodating retraction and projection of a step is illustrated in FIGS. 7, 8 and 9 wherein members 70 are secured between base members 22 at the upper level thereof and serve to support pairs of spaced brackets 72 each spanned by a pair of vertically spaced pins 74 and 76. Two or more pairs of brackets spaced along the length of the frame base 22 are provided, and each pair thereof receives a step-supporting arm 78 to which a step-forming member 80 is secured. The lower edge of each arm 78 is adapted to bear upon a member 22 when in operative position, and each arm has its lower inner end portion beveled, cut-away or rounded at 82. Each arm 78 has an L-shaped opening 84 formed therein, the length of each leg of which opening is equal to the spacing between the remote surfaces of the pins 74 and 76. The central portion of the L-shaped opening is preferably rounded at 86 to accommodate, in conjunction with the cutaway at 82, the swinging of the arms 78 and the step 80 carried thereby between an operative horizontal position, as shown in full lines in FIGS. 7 and 8, and a vertical retracted position, as shown in dotted lines in FIGS. 7 and 8. The ends of the arms 78 bear upon the frame members 22-70 in the vertical position. In this arrangement, the step 80 maintains either its operative or its retracted position until intentionally moved therefrom, and the construction provides a strong, compact, convenient step for a workman, and accommodates retraction of that step when it is not needed.

Another construction of a retractible step is illustrated in FIGS. 12, 13 and 14. A pair of horizontal parallel guides, such as channel members 90, are secured to the opposite ends of base members 22 at one side of the carrier to guide endwise sliding travel of arms 92 which carry a step 94. Suitable means are provided to limit the inner and outer travel of the step. As here shown, the limit means constitutes a leaf spring 96 carried by each guide 90 and having an offset or detent 98 projecting through an opening in the guide and received in a longitudinal groove 100 of the adjacent arm 92. Recesses 102 at the ends of the groove 100 receive the offset ends 98 of the leaf springs and define the inner and outer limits of sliding movement of the step.

The retractable mounting of a step is not essential, and the carrier may be provided with a fixedly mounted step. One such construction is illustrated in FIG. 10 wherein a Z-shaped member 110 is welded or otherwise fixedly secured to the frame base 22-70, being reinforced by an upturned flange 112 at its inner end and a downturned flange 114 at its other end.

Another alternate construction is illustrated in FIG. 11 wherein the top surfaces of the channel members 22 forming part of the base along one side of the frame, and an intermediate longitudinal plate 70 coplanar therewith provide a step on which a workman can stand. FIG. 11 also illustrates a construction wherein a gusset plate 120 is secured at the junction of members 26 and 28, and a plurality of V-shaped members 44' are carried at different elevations and at different spaced relations to upright 26 for the support of the ends of bars 46 of the sling 48.

While the preferred embodiments of the invention have been illustrated and described, it will be understood that changes in the construction may be made within the scope of the appended claims without departing from the spirit of the invention.

What I claim is:

1. A green tire carrier comprising
   a wheel supported rigid frame having a base portion and superstructure.
   sling supports carried by said frame at three levels thereof,
   tire supporting slings carried by said sling supports,
   said uppermost sling supports being located at an elevation above the reach of a workman of average height, and
   a step member carried by said frame at one side thereof below the level of and substantially parallel to the sling supports of the lowermost slings and adapted to support a workman in position to apply tires to and remove tires from the uppermost sling means.

2. A green tire carrier as defined in claim 1, wherein said slings are adjustable on said sling supports to accommodate tires of a range of different sizes, and are spaced vertically to accommodate tires of the largest size in said range with slight clearance, and means on said superstructure for selectively laterally positioning the two upper slings remote from the side of the frame which carries said step and each clear of tires in the next lower sling.

3. A green tire carrier as defined in claim 1, wherein said step member is shiftable between a substantially horizontal operative position projecting laterally from said frame and a position retracted within the outline of said frame.

4. A green tire carrier as defined in claim 3, wherein said step member is pivoted to said frame for support by said frame in its horizontal operative position, said step being substantially vertically positioned when retracted.

5. A green tire carrier as defined in claim 4, and spring means normally urging said step means to retracted position.

6. A green tire carrier as defined in claim 4, wherein said frame carries adjacent each end of said step member a pair of vertically spaced rigid pins and said step member includes a part at each end thereof having a substantially L-shaped aperture receiving said pins and accommodating swinging of said step between and limiting swinging at said horizontal and vertical positions.

7. A green tire carrier as defined in claim 3, wherein horizontal guide means are carried by said frame and said step is slidable in said guide means.

8. A green tire carrier as defined in claim 7, and spring detent and recess means for releasably maintaining said step in selected position.

* * * * *